United States Patent Office 2,801,953
Patented Aug. 6, 1957

2,801,953

PROCESS OF PREPARING CRYSTALLIZED INSULIN PREPARATIONS

Eugen Dörzbach and Fritz Lindner, Frankfurt am Main, Germany, assignors to Farbwerke Hoechst Aktiengesellschaft vormals Meister Lucius und Brüning, Frankfurt am Main, Germany, a company of Germany No Drawing. Application February 25, 1953, Serial No. 338,888

Claims priority, application Germany February 28, 1952

3 Claims. (Cl. 167—75)

The present invention relates to a process of preparing crystallized insulin preparations.

In our co-pending application, Serial No. 217,902 filed on March 27, 1951, now Patent 2,693,434, for "Crystallized Insulin Preparation and Process of Preparing Same" there is described a process for the production of crystalline reaction products of insulin with a water-soluble salt of a base of the acridine or quinoline series at best colloidally soluble in water within a pH range of 6.5 and 9, wherein the crystallization of the reaction product is conducted in the manner usual for the pure insulin. The crystals so obtained represent insulin compounds containing varying quantities of the bases in question and are highly suitable for the production of insulin preparations having a prolonged action.

Now, we have found that these crystalline reaction products of insulin can be obtained by a new and especially simple method. It has surprisingly been found that normal insulin crystals can be transformed into compounds containing the above bases, without change of their size or their form, by stirring them with aqueous solutions of a water-soluble salt of these bases while maintaining the pH at about neutral reaction by addition of alkali. Under these conditions the bases are quantitatively absorbed by the crystals within a few hours, and there are obtained products which exert the same prolonged action as the crystals obtained by the process of our above mentioned copending application, and can be used for the production of depot preparations in the same manner.

The new process involves a number of advantages. Crystalline products of uniform size, as are obtained in large batches in the normal preparation of insulin, can now be used for the manufacture of the new products, and a uniform product is thus guaranteed. Furthermore, final products are obtained which at no stage contain any amorphous particles so that processing by fractional sedimentation is unnecessary. When working is carried out from the commencement under sterile conditions, it may even be possible to dispense altogether with any isolation of the crystals. When proceeding in such a way suspensions are obtained directly which are ready for use.

According to a further feature of the invention, products of a similar prolonged action are obtained by using, instead of the described acridine or quinoline derivatives, basic proteins or their degradation products, for instance, globine, histones, protamines and their degradation products.

The reaction is conducted under the same conditions as in the case of acridine and quinoline derivatives. The proteins are as completely absorbed by the insulin crystals as the acridine or quinoline bases.

The following examples serve to illustrate the invention, but they are not intended to limit it thereto:

Example 1

40 milligrams of bis-2-methyl-4-amino-quinolyl-6-carbamide-hydrochloride are dissolved in 500 cc. of water and adjusted with 0.7 cc. of N/10-sodium hydroxide solution to a pH of 7.2. 1 gram of crystalline insulin is introduced into this solution, while stirring, by further addition of N/10-sodium hydroxide solution a pH of 7.2 is maintained, while stirring is continued. After stirring for 24 hours, 1.95 cc. of N/10-sodium hydroxide solution are consumed and all the bis-2-methyl-4-amino-quinolyl-6-carbamide is absorbed by the insulin crystals.

The crystals are centrifuged, washed twice with water and dried with acetone and ether. 0.97 gram of insulin crystals is obtained containing 4 percent of bis-2-methyl-4-amino-quinolyl-6-carbamide, calculated upon the hydrochloride.

Example 2

5 grams of insulin are dissolved in 225 cc. of water and 25 cc. of glacial acetic acid, the solution is passed through a sterilization filter, made up to 1.3 litres, and 150 cc. of acetone and 160 cc. of zinc chloride solution of 0.5 percent strength are added. The whole is then adjusted with ammonia, under sterile conditions, to a pH of 5.5, and, by stirring for a short time, uniform insulin crystals of about ½₀₀ millimetre length are obtained. The insulin crystals are centrifuged, washed with water and stirred in a neutralized solution of 0.3 gram of bis-2-methyl-4-amino-quinolyl-6-carbamide hydrochloride in 2.5 litres of water, which contains 0.5 percent of acetone-chloroform ($CCl_3.C(CH_3)_2.OH$), and worked up as described in Example 1, sterile conditions being maintained. After 24 hours, sodium chloride solution is added in such an amount that a suspension of 1.7 milligrams of insulin per cc. in isotonic sodium chloride solution is obtained which is filled into ampoules of 10 cc. while stirring. In this way a depot insulin preparation containing 40 units per cc. is obtained.

Example 3

750 milligrams of bis-2-methyl-4-amino-quinolyl-6-carbamide hydrochloride are dissolved in 750 cc. of redistilled sterile water and adjusted with N/100-sodium hydroxide solution to a pH of 5.6. 10 grams of crystalline insulin are then stirred with redistilled sterile water, and, together with a total quantity of 500 cc. of water, added to the above solution. In the course of 4 hours the reaction mixture is gradually adjusted, while stirring, to a pH of 7.2 by means of N/100-sodium hydroxide solution which is introduced dropwise through a dropping funnel. The pH remains unchanged during further stirring for 2 hours. The crystals obtained are centrifuged, washed twice with redistilled sterile water and dried with acetone and ether. There are obtained in a practically quantitative yield morphologically unchanged crystals containing 6.3 percent of bis-2-methyl-4-amino-quinolyl-6-carbamide, calculated upon the hydrochloride.

Example 4

8 milligrams of protamine sulfate are dissolved in water, the solution adjusted with sodium hydroxide solution to a pH of 7.2 and made up to 40 cc. 80 milligrams of crystalline insulin are introduced into this solution and the whole is stirred for 24 hours with continuous readjustment of the pH with N/10-sodium hydroxide solution. After this time protamine can no longer be detected in the mother liquor. The crystals are centrifuged, washed with water and dried. A product is obtained, which, when injected in an aqueous suspension, has a prolonged action.

We claim:

1. A process of preparing crystallized insulin preparations comprising stirring insulin crystals at about neutral pH while maintaining said pH by addition of alkali with an aqueous solution of a water-soluble salt of an organic base selected from the group consisting of bis-2-methyl-4-amino-quinolyl-6-carbamide and protamine, whereby without dissolution of the insulin crystals, said base is absorbed by said crystals.

2. The process of preparing crystallized insulin preparations by stirring insulin crystals in an aqueous solution of bis-2-methyl-4-amino-quinolyl-6-carbamide hydrochloride at about neutral pH while maintaining said pH by addition of sodium hydroxide solution, whereby without dissolution of the insulin crystals the bis-2-methyl-4-amino-quinolyl-6-carbamide is absorbed by said crystals.

3. The process of preparing crystallized insulin preparations by stirring insulin crystals in an aqueous solution of protamine sulfate at about neutral pH while maintaining said pH by addition of sodium hydroxide solution, whereby without dissolution of the insulin crystals the protamine is absorbed by said crystals.

References Cited in the file of this patent

UNITED STATES PATENTS 2,693,434     Lindner et al. _____ Nov. 2, 1954

FOREIGN PATENTS 727,888     Germany _____ Nov. 17, 1942

OTHER REFERENCES

I. G.—Hochst—Office Publication Board Report No. PB–981, July 1945, pages 48–60 (particularly pages 48 to 51).